July 29, 1952   L. C. GRIMSLEY   2,605,316
SHOCK ABSORBER ASSEMBLY FOR PORTABLE ELECTRIC FLASHLIGHTS
Filed Dec. 3, 1947
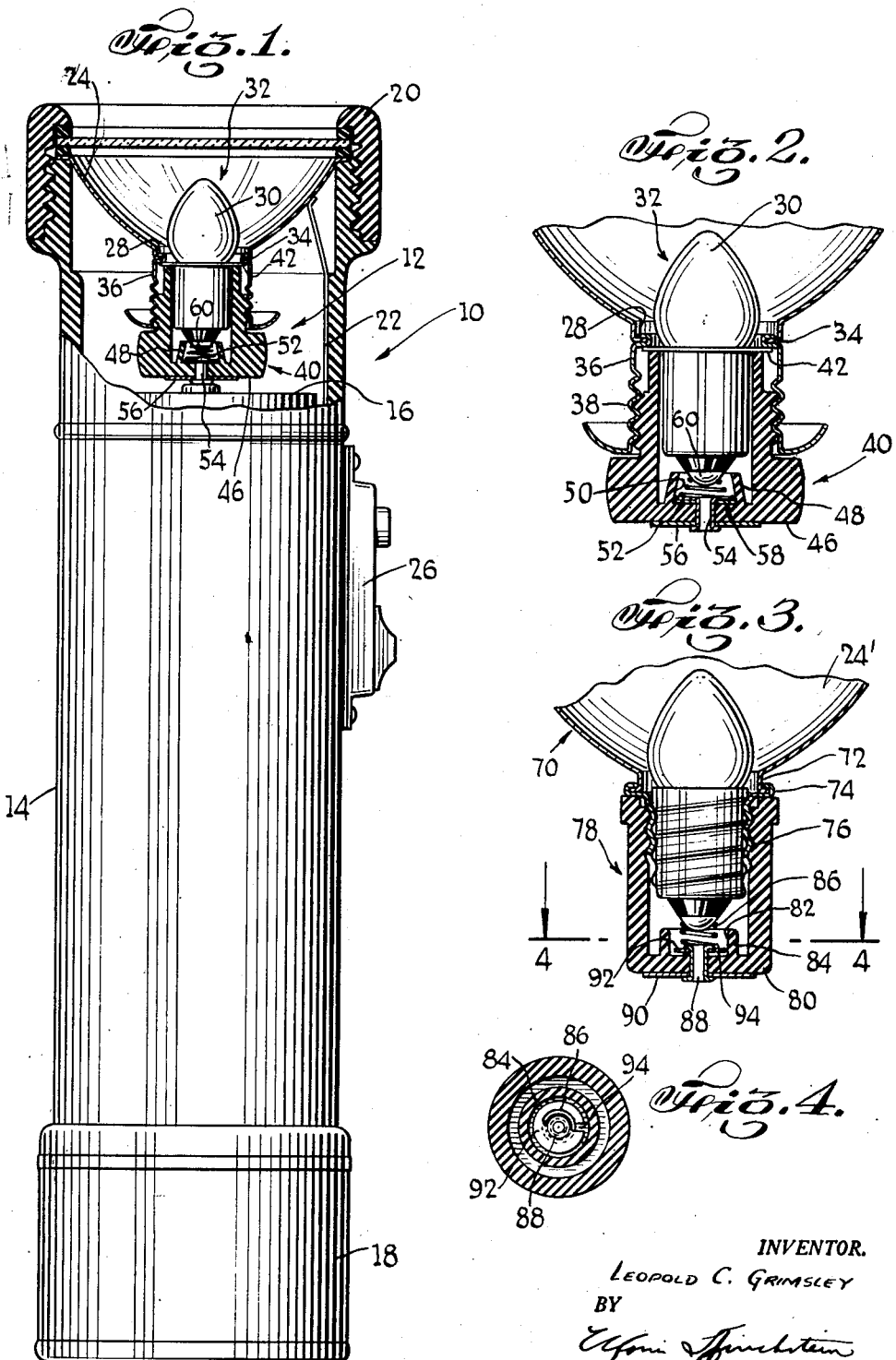
INVENTOR.
LEOPOLD C. GRIMSLEY
BY
ATTORNEY Patented July 29, 1952

2,605,316

UNITED STATES PATENT OFFICE 2,605,316

SHOCK ABSORBER ASSEMBLY FOR PORTABLE ELECTRIC FLASHLIGHTS

Leopold C. Grimsley, New York, N. Y., assignor to Henry Hyman, New York, N. Y.

Application December 3, 1947, Serial No. 789,514

3 Claims. (Cl. 173—328)

This invention relates to portable electric flashlights and, more particularly, is concerned with a shock absorber assembly which is used to provide a resilient contact for the central terminal of an electric flashlight lamp. Even more specifically, the invention is concerned with an improved means for holding in place a coil spring which acts as the resilient contact and with the method for incorporating said holding means in the shock absorber assembly.

As a general rule, shock absorber assemblies are employed in connection with portable electric flashlights which have no internal partitions. Where an internal partition is used, a battery loaded in the flashlight hits against the partition but when the partition is omitted, a battery dropped into the casing would strike the central terminal of the lamp if no safeguard such as a shock absorber assembly were provided. In essence, a shock absorber assembly comprises a bushing which is secured in some conventional manner to a flashlight reflector and is provided with suitable means to at least partially house, i. e. cover, the base of the lamp. The leg of an electric circuit from the batteries to the lamp shell is made through the reflector or a lamp-receiving ferrule or the bushing. If the lamp shell is of the bull's eye or screw type, the bushing, ferrule or reflector has a mating thread and if the shell of the lamp is of the push or prefocus type, said thread is omitted. The bushing carries the central contact. This central contact is in the form of a resilient electrically conductive member engaging the central terminal of the lamp and in electrical contact with a rivet or the like stationary electrically conductive member which is carried by the bushing and has a part disposed in a position where it can be abutted by the central terminal of the uppermost battery in the flashlight casing. With this arrangement, if a battery is dropped in the casing and allowed to strike sharply against the rivet, the resulting shock is not transmitted to the lamp.

Although shock absorber assemblies are highly desirable for the foregoing reason, considerable difficulty has been experienced commercially with their constructions and incorporation in flashlights. One shock absorber includes a tapered coil spring which is fitted loosely in the bushing. This type of shock absorber is easy to assemble but the spring can fall out accidentally and be lost when lamps are changed. Once the spring is lost, the flashlight is useless. Another kind of shock absorber uses a tapered coil spring which is fitted tightly in the bushing to prevent the spring from becoming loose. However, such a spring is extremely difficult to mount in proper position. Another flashlight employs a coil spring which tapers toward both ends and is frictionally held in the bushing. This spring, also, is difficult to mount and, furthermore, tends to tip sideways. Still another shock absorber uses a flat spring which is bent into an L-shape and is secured in the bushing by a rivet extending through an aperture in one of the legs of the L. After mounting, the other leg of the L is bent to an acute angle with respect to the first leg. Such a spring requires two bending operations and, after bending, is quite fragile. Yet another shock absorber uses a cylindrical coil spring which is frictionally held in the bushing. This spring, like the frictionally held springs mentioned above, is hard to mount and involves a relatively expensive and not always satisfactory assembly.

It is an object of the present invention to provide a shock absorber assembly which avoids all of the foregoing defects and includes a shock absorber spring permanently and captively held in place with a means which is easy to assemble.

More specifically, it is an object of the invention to provide a shock absorber assembly wherein the shock absorber spring is of helical configuration and is permanently secured adjacent one end thereof to the bottom of the bushing.

It is an additional object of the invention to provide a shock absorber assembly comprising relatively few and simple parts and which is rugged and efficient in operation.

Other objects of the invention will in part be obvious and in part be pointed out hereinafter.

The invention accordingly consists in the features of construction, combinations of elements, and arrangements of parts of which the scope of application will be indicated in the appended claims.

In the accompanying drawings in which are shown various possible embodiments of the invention:

Fig. 1 is a side view of a flashlight partially broken away to show the shock absorber assembly which is constructed in accordance with my invention.

Fig. 2 is an enlarged, fragmentary vertical sectional view of the shock absorber assembly shown in Fig. 1;

Fig. 3 is a view similar to Fig. 2 of a flashlight embodying a modified form of the invention; and Fig. 4 is a sectional view taken substantially along the line 4—4 of Fig. 3.

Referring in detail to the drawings, and more particularly to Figs. 1 and 2, the reference numeral 10 denotes a flashlight which is conventional in all respects save for the shock absorber assembly 12. Such flashlight comprises a molded casing 14 of synthetic resin such, for instance, as ethyl cellulose. The casing is open at both ends and is adapted to use flashlight batteries 16. The lower end of the casing is closed by a bottom cap 18 and the upper end by a top cap 20. Suitable electric connections are provided within the casing to supply electric potential to a resilient finger 22 whose free end presses against a reflector 24 held in place by the top cap 20. The leg of the circuit between the batteries 16 and the resilient finger can be closed or opened by a manually operable switch 26 secured to the exterior of the casing.

The center of the reflector is formed with a shallow recess 28 whose base is provided with an opening larger than the envelope 30 of a flashlight lamp 32, said lamp being of the push or pre-focus type with smooth side walls on its base. The inturned base flange 34 resulting from the provision of the central opening has secured thereto, as by clinching, a downwardly extending ferrule 36 in which a threaded portion 38 is impressed. This portion receives a threaded bushing 40 of an electrically non-conductive material, such as a plastic, the bushing being adapted to clamp the flange 42 of the pre-focus lamp against the shoulder at the upper end of the ferrule.

Said bushing is a component of the shock absorber assembly and, pursuant to the present invention, has a base wall 46 from which an integral annular, upstanding flange 48, symmetrically disposed with respect to the axis of symmetry of the bushing, extends to define a well 50. The bushing is fabricated from a thermoplastic material and when first molded, the flange 48 is formed to substantially uniform diameter, optionally having a slight draft imparted thereto to facilitate stripping from the mold. Such diameter is sufficiently large to enable the well to receive an upwardly tapering, helical compression spring 52. Desirably, the lowest turn of the spring is but slightly smaller in diameter than the inner diameter of the flange 48.

Before the spring is put in place, a rivet 54 is inserted through an opening in the bottom wall of the bushing and through central openings in an electrically conductive disc 56 on the external surface of the bottom wall of the bushing and another electrically conductive disc 58 on the internal surface of the bottom wall of the bushing. This latter disc is disposed at the bottom of the well 50, whereby an electrical connection is made between the spring 52 and the contact terminal formed by the disc 56. Both ends of the rivet are headed to hold the discs in position.

It may be mentioned that, as shown in Fig. 1, said contact terminal (including the lower head of the rivet 54) functions as the stationary contact terminal against which the central terminal of the uppermost battery is designed to abut.

After the helical spring 52 has been set in place within the annular flange 48, said flange is deformed so as to reduce at least one dimension of its mouth whereby to cause at least portions of the side walls of the flange to converge upwardly. This deformation can be practiced in any manner well known in the plastic art, for example by forcing a heated member having a frusto-conical opening therein down upon the flange so as to cause the flange to take on a matching shape, as illustrated in Fig. 2. Alternatively, only local portions of the flange may be thus deformed. In either event, the rim of the well thus is given a mouth having at least one dimension smaller than of the large lower turn of the helical spring so that said spring is captively held in place by means associated with the bottom wall of the bushing.

The upper end of said spring is adapted to resiliently engage the center contact 60 of the flashlight lamp.

In the modified form of the invention shown in Figs. 3 and 4, all parts similar to the parts illustrated in Figs. 1 and 2 are denoted by the same reference numerals primed. This second form of the invention differs from the form first described in the type of lamp illustrated and in the means employed to captively hold the helical shock absorber spring in place.

The shock absorber assembly 70 illustrated in Figs. 3 and 4 includes a reflector 24' having a central integral depending sleeve 72 whose lower end has a projecting flange on which is clamped an outwardly extending flange 74 of a screw ferrule 76. Said ferrule has threaded on it an enveloping bushing 78 which is part of the shock absorber assembly. This bushing, like the bushing 40, is fabricated from an electrically non-conductive material.

The bottom wall 80 of said bushing is provided with a well 82. This well, may, as illustrated, be formed by means of an annular ledge 84 integral with and extending upwardly from the bottom wall of the bushing, or the well merely may comprise a cavity molded in said bottom wall. In either case, the well is disposed concentrically with respect to the axis of symmetry of the bushing.

A helical shock absorber spring 86, whose turns are of uniform diameter, is located in said well. The spring is permanently and rigidly retained in the bushing by a hollow rivet 88. The lower head of this rivet rests against the central portion of the undersurface of an electrically conductive disc 90 and holds the disc against the exterior surface of the bottom of the bushing. Said rivet extends through an opening in the bottom wall of the bushing and through a central opening in an electrically conductive disc 92 located within the wall 82. This latter disc is disposed above at least a portion of the lowermost turn of the helical spring 86 so that when the upper end of the rivet is headed, as by spinning, and the disc 92 is forced toward the bottom wall of the bushing, it will clamp this portion of the lowermost turn of the spring between itself and said bottom wall whereby to hold the spring captively in place by means associated with the bottom wall of the bushing.

Any suitable arrangement may be employed to permit the spring to extend through the upper disc 92. As shown herein, this is accomplished by forming said disc with a notch 94 on its outer edge through which a turn of the spring extends.

It thus will be seen that there are provided shock absorber assemblies which achieve the several objects of the invention and are well adapted to meet the conditions of practical use.

As various possible embodiments might be made of the above invention, and as various changes might be made in the embodiments set forth, it is to be understood that all matter herein described or shown in the accompanying drawings is to be interpreted as illustrative and not in a limiting sense.

Having thus described the invention, there is claimed as new and desired to be secured by Letters Patent:

1. For use in a flashlight, a shock absorber assembly comprising a bushing of electrically non-conductive material, said bushing having a base wall from which an integral annular flange upstands to define a well within the interior of the bushing, a helical spring of electrically conductive material disposed in said bushing and having at least a lower portion thereof located within said well, the botom of said spring being seated against the bottom of said well, said well having at least a portion of its side walls tapering inwardly whereby a dimension of the mouth of the well is smaller than a corresponding dimension beneath the mouth, said spring having a portion adjacent its lower end larger than the dimension of the mouth of the well whereby said spring is captively held within said well, a terminal on the external surface of said base wall, and an electrically conductive element extending through said base wall and in contact with said spring and said terminal.

2. For use in a flashlight, a shock absorber assembly comprising a bushing of electrically non-conductive material, said bushing having the base wall from which an integral annular flange upstands to define a well within the interior of the bushing, a helical spring of electrically conductive material disposed in said bushing and having at least a lower portion thereof located within said well, the bottom of said spring being seated against the bottom of said well, said well having at least a portion of its side walls tapering inwardly whereby a dimension of the mouth of the well is smaller than a corresponding dimension beneath the mouth, said spring having a portion adjacent its lower end larger than the dimension of the mouth of the well whereby said spring is captively held within said well, a terminal on the external surface of said base wall, an electrically conductive member between the bottom of said well and the bottom of said spring whereby said spring is in electrical contact with said member, and an electrically conductive element extending through said portion and in contact with said member and said terminal.

3. For use in a flashlight, a shock absorber assembly comprising a bushing of electrically non-conductive material, said bushing having a base wall from which an integral annular flange upstands to define a well within the interior of the bushing, an upwardly tapering helical spring of electrically conductive material disposed in said bushing and having at least a lower portion thereof located within said well, the bottom of said spring being seated against the bottom of said well, said well having at least a portion of its side walls tapering inwardly whereby a dimension of the mouth of the well is smaller than a corresponding dimension beneath the mouth, said spring having a portion adjacent its lower end larger than the dimension of the mouth of the well whereby said spring is captively held within said well, a terminal on the external surface of said base wall, and an electrically conductive element extending through said base wall and in contact with said spring and said terminal.

LEOPOLD C. GRIMSLEY.

REFERENCES CITED

The following references are of record in the file of this patent:

UNITED STATES PATENTS

| Number | Name | Date |
|---|---|---|
| 1,602,221 | Godley | Oct. 5, 1926 |
| 1,933,304 | Bell | Oct. 31, 1933 |
| 2,080,827 | Mascuch | May 18, 1937 |
| 2,271,421 | Gits | Jan. 27, 1942 |
| 2,274,178 | Wood | Feb. 24, 1942 |
| 2,420,138 | Ingalls | May 6, 1947 |
| 2,437,373 | Bernstein | Mar. 9, 1948 |